June 6, 1961

R. L. GRIFFIN 2,987,162

COMPUTER DEVICE FOR LEATHER STACKER

Filed May 29, 1958

INVENTOR.
Roger L. Griffin
BY
R. G. Story
ATTORNEY

Fig. 2

INVENTOR.
Roger L. Griffin
BY
R. G. Story
ATTORNEY

Fig. 3

INVENTOR.
Roger L. Griffin

June 6, 1961  R. L. GRIFFIN  2,987,162
COMPUTER DEVICE FOR LEATHER STACKER
Filed May 29, 1958  6 Sheets-Sheet 5

ROGER L. GRIFFIN
INVENTOR.

BY R.A.Tony
Attorney

United States Patent Office 2,987,162
Patented June 6, 1961

2,987,162
COMPUTER DEVICE FOR LEATHER STACKER
Roger L. Griffin, Manchester, Mass., assignor to Swift & Company, Chicago, Ill., a corporation of Illinois
Filed May 29, 1958, Ser. No. 738,685
14 Claims. (Cl. 198—21)

The present invention relates to an apparatus and a method for determining when a predetermined percentage of a length of articles of varying sizes, moving along a conveyor, reach a point on the conveyor. The embodiments hereinafter described were devised for use with apparatus wherein sheets are transferred from a conveyor to bar hangers with the sheets being looped over the bar with a given percentage of the total length of each sheet being hung over one side of the bar even though the sheets may vary in size. More specifically, the present method and embodiments were devised for use with an apparatus wherein the conveyor operates intermittently and the sheets are advanced across the bar at an irregular rate.

This application forms a continuation-in-part of my prior application Serial No. 627,352, filed December 10, 1956, now Patent No. 2,837,198, entitled Computer Device for Leather Stacker.

I have previously devised a transporting and stacking apparatus for use in the leather industry wherein each sheet of leather is loaded from a conveyor onto a bar hanger or carrier with the leather being draped over the carrier. The carrier is then mechanically transported to another point whereas the sides of leather are unloaded from the carriers and stacked onto suitable supports such as tables or horses. During the course of transporting of the sides of leather, they may or may not be moved through certain treating mechanisms such as dryers. This prior apparatus which I have invented is discussed more fully in my patent application Serial No. 595,706, filed July 3, 1956, now Patent No. 2,855,089.

In this previous invention, the instant when the carrying member was lifted up to receive the side of leather from the conveyor in a manner such that the side of leather was draped over the carrier was determined from the time when the leading edge of the side of leather (or it could be the trailing edge) reached a specific point with respect to the conveyor. This procedure is quite satisfactory as long as the sides of leather (or such other sheets of material as might be handled) are of substantially the same length. However, when there is a very wide variance in the length of the sides of leather, it will be found that if the apparatus is adjusted for sides of one length, then sides of a much shorter or longer length are not satisfactorily draped over the carrying member. In some leather operations it is quite common for the length of the leather to vary considerably. Side leather from cattle varies from about six to eleven feet, and sheepskins and calfskins vary between about two to five and one-half feet in length.

Another factor contributing to the unsatisfactory operation of a stacking apparatus is the phenomena exhibited by certain sides of leather causing them to appear as two separate pieces of leather to the sensing device at the specific point on the conveyor. This sometimes occurs with sides of leather exhibiting holes or unusually narrow portions between the leading and trailing edges. The effect is that the holes or narrow portions are sometimes interpreted as the trailing edge of one piece and the leading edge of another nonexistent piece. Upon this event the stacker will operate to receive the nonexistent piece with the possible result of unsatisfactory operation for the next succeeding actual side of leather.

The procedure is further complicated where the passage of the side of leather with respect to the conveyor is periodically interrupted as, for example, during the operation of a processing machine. Under such a condition, the leather may be stopped after the leading (or trailing) edge has reached the specific point, but before it is in proper position with respect to the carrying member, thus resulting in premature lifting to the carrying member.

Thus, a principal object of my invention is to prevent malfunction of the apparatus due to irregularities in the surface area of the sides of leather.

An additional object of my invention is to provide a compensation for interruptions in the feed of a side of leather to a stacking device and to insure initiation of the movement of the carrying member at a time such that a predetermined percentage of the side of leather will be draped over one side of the carrying member.

Another object of the present invention is to control the stacking and transporting apparatus to initiate the movement of the carrying member at a time such that a predetermined percentage of the side of leather will be draped over one side of the carrying member and the remainder of the leather is draped over the other side of the carrying member. This enables the stacking apparatus to operate with widely varying lengths of sheets. It will be readily apparent that the method and apparatus of my invention may be utilized in other applications where it is desired to ascertain when a given percentage of lengths of articles moving along a conveyor will reach a given point along the conveyor.

A further object and advantage of the apparatus which I have devised is its relative simplicity, coupled with a very high degree of accuracy and reliability. There is nothing complicated about the structure. The parts are readily produced and maintained by nominal metal working operations. Its operation is quickly understood once the invention has been shown and described to one desiring to acquaint himself with it.

Other objects and advantages will become apparent from the following description taken in conjunction with the drawings in which.

The method that I have devised for determining when a particular part of the articles traveling along a conveyor is at a given location with a predetermined percentage of the article to one side of that location perhaps can be better explained after discussing the apparatus that will carry out this method. However, briefly, this method contemplates choosing a point along the conveyor rearwardly of the predetermined location, determining as a standard the length of time that would be required by an article traveling, uninterruptedly, at a constant speed along said conveyor to pass said given point if the length of the article were equal to the distance between the given point and the predetermined location divided by the percentage of the length of the article that is to be rearwardly of said location. This standard I consider as a control time run-down. As an article of unknown length travels along the conveyor, I then measure the length of time it would require that article to uninterruptedly traverse the given point, disregarding any apparent articles of less than a predetermined length, and subtract the time from the standard to obtain a time difference for that article. That time difference is then multiplied by said rearward percentage to complete the time run-down at a faster rate, which will give a figure representing the earliest time after the trailing edge of the article passes said given point when the desired part of the article is over said location with said percentage of the article rearwardly of said location. Simultaneously all periods of interruption are cumulatively measured and added to the figure representing the earliest time.

Figure 1:
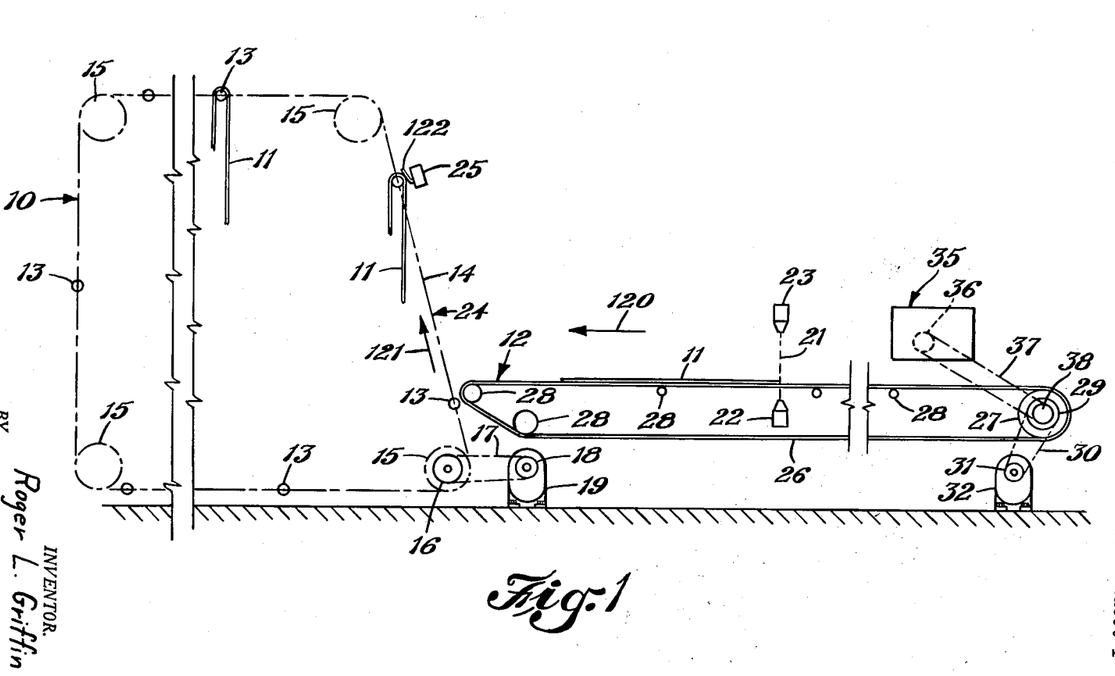
FIGURE 1 is a schematic elevation of an apparatus incorporating the invention.

Referring to FIGURE 1, a stacker generally 10 receives sides of leather 11 from a conveyor generally 12. Stacker 10 and conveyor 12, of course, are mounted on suitable frames, not shown in the schematic illustration of FIGURE 1. The stacker 10 has a plurality of carrying members 13 which are elongated rods over which the sides of leather 11 are hung. Carrying members 13 are suspended between a pair of endless chains 14 which travel about a path determined by the position of a plurality of sprockets 15. Attached to one of the sprockets 15 is a sprocket 16 which is driven by a chain 17 from a sprocket 18 on the output shaft of a suitable power means represented in FIGURE 1 by gear head motor 19. The structure of the stacker 10 thus far described is illustrated in greater detail in my prior applications Serial Nos. 554,188, now abandoned, and 595,706, filed December 20, 1955, and July 3, 1956, respectively. In the invention therein described the power means 19 is rendered effective a predetermined length of time after a side of leather 11 moving along conveyor 12 cuts a light beam 21 from a light source 22 directed at an electric eye means 23. Instead of using electric eye means 23, a switch might be actuated by contact with the side of leather. The period of time is adjusted so that sides of leather 11 of approximately a predetermined length will be looped over one of carrying members 13 positioned immediately adjacent the discharge end of conveyor 12 at the time that that carrying member commences its upwardly movement along the generally vertical run 24 of the path of movement of carrying members 13 and chains 14. After having moved a predetermined distance a switch 25 is actuated to again disable the power means 19 to stop the movement of the stacker. When the stacker stops, a carrying member 13 again will be immediately adjacent the discharge end of conveyor 12. The present invention might be employed with various types of stacking apparatus.

While the present invention is concerned with a conveyor 12, the particular structure of the conveyor is not important insofar as the present invention is concerned. In the disclosed embodiment it consists of a plurality of ribbons 26 which at one end pass about driving drum 27 and are supported by a plurality of idling pulleys 28. A sprocket 29 is connected by a chain 30 to a sprocket 31 on the output shaft of a power means represented by gear head motor 32.

To carry out the method previously described, a computer generally 35 having a drive sprocket 36 thereon is connected by means of a chain 37 to a sprocket 38 driven in unison with conveyor 12 such as by attaching sprocket 38 to sprocket 29. The computer 35 is actuated by the electric eye means 23 so as to measure the length of time that it takes for an article such as side of leather 11 to traverse a given point along conveyor 12, which point in FIGURE 1 is represented by the position of light beam 21. The computer is then connected to power means 19 of stacker 10 so as to determine when is the proper time to start the movement of carrying members 13 so that a given proportion or percentage of the side of leather will be hung on each side of the carrying member as the carrying member moves upward. Thus, in this embodiment it is desired to know just when a given part of the side of leather will be at a predetermined location with respect to conveyor 12, which location in this embodiment is a point immediately adjacent the end of conveyor 12, i.e. the pick-up point of carrying member 13.

Figure 2:
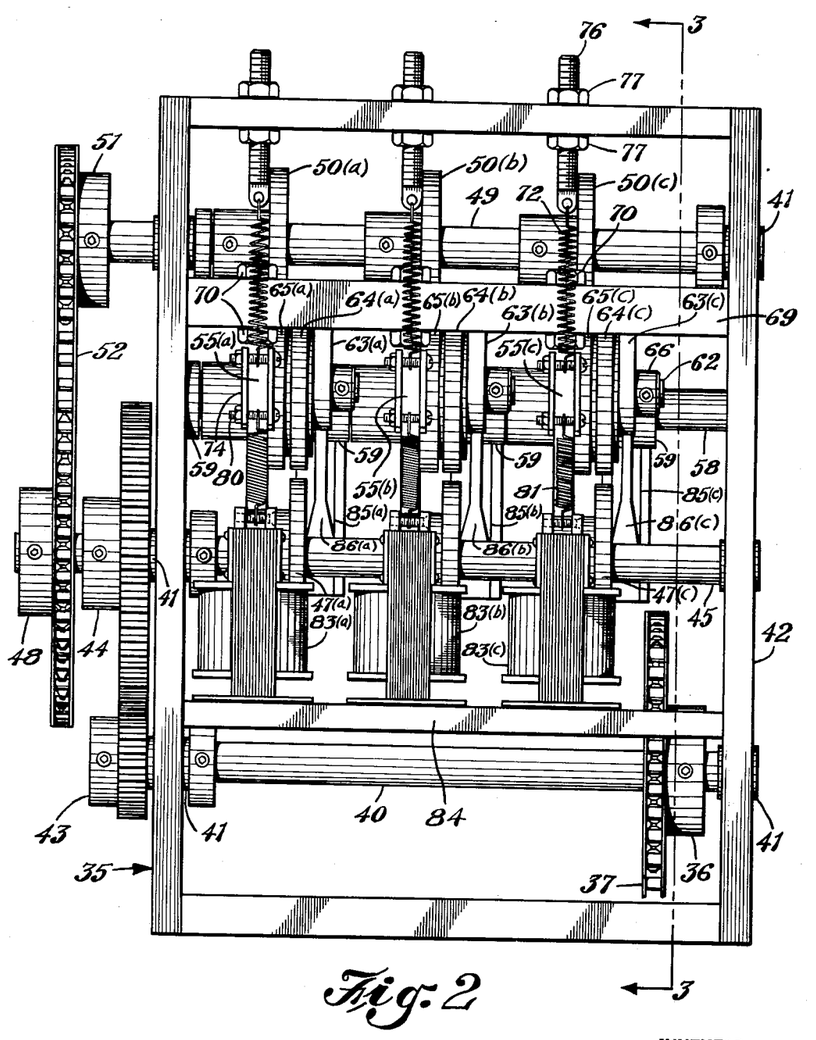
FIGURE 2 is an end elevation of an embodiment of the computing structure.
Figure 3:
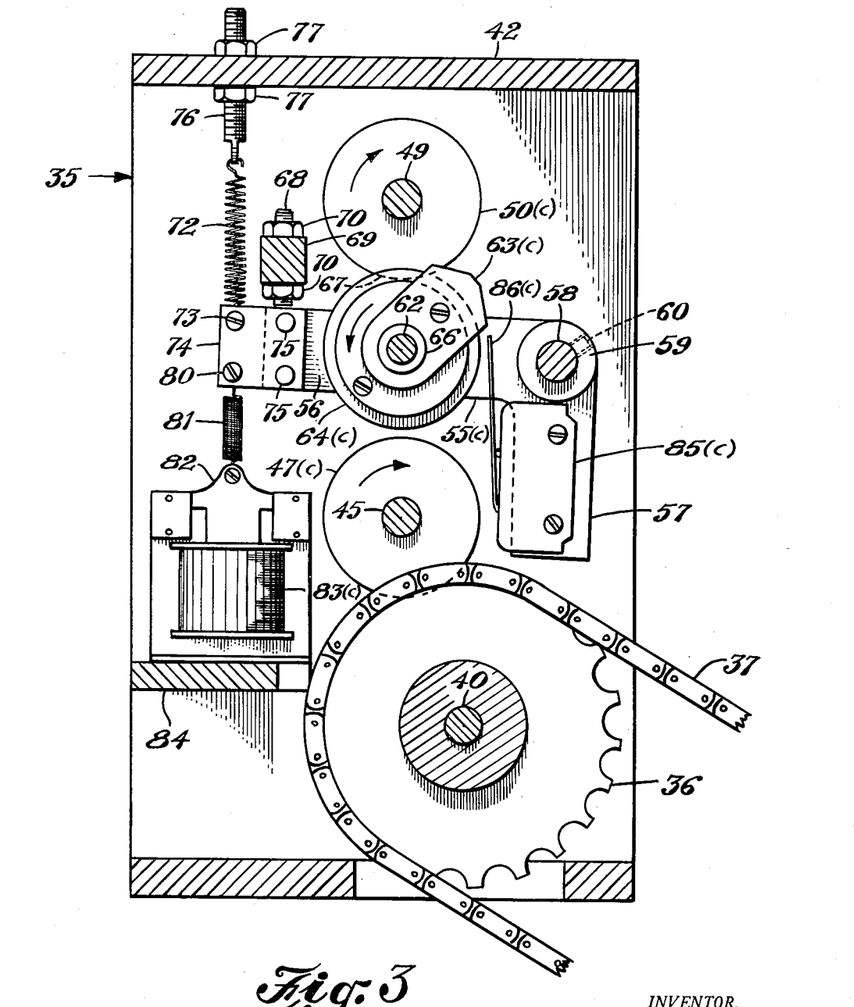
FIGURE 3 is a section taken at line 3—3 of FIGURE 2.

The structure of computer 35 is illustrated in FIGURES 2 and 3. Drive sprocket 36 is attached to a shaft 40 suitably journaled in bearings 41 mounted in the frame 42 of the computer. At the opposite end of shaft 40 is a gear 43 which engages a gear 44 on a second shaft 45. Shaft 45 is likewise journaled in a pair of bearings 41 in frame 42. In addition to having gear 44 attached to shaft 45, there are also three lower drive wheels 47a, 47b and 47c and a sprocket 48 attached to the shaft. An upper drive shaft 49 is suitably mounted in a pair of bearings 41 in frame 42. Shaft 49 has three identical upper drive wheels 50a, 50b and 50c and a sprocket 51 connected to sprocket 48 by a chain 52.

Three rockers, 55a, 55b and 55c, each having a pair of arms 56 and 57 are pivotally mounted on a fixed shaft 58 attached to frame 42. A plurality of collars 59 attached to shaft 58 by set screws 60 hold rockers 55 in place on the shaft, yet permitting the rockers to freely rotate about the shaft. On arm 56 of each of rockers 55 is a stub shaft 62. Stub shaft 62 on rocker 55a carries a cam 63a attached to two drive rolls 64a and 65a, which are attached together and held on shaft 62 by a collar 66 whereupon they rotate freely as a unit on shaft 62. Identical cams 63b and 63c are on rockers 55b and 55c, respectively, together with corresponding pairs of drive rolls 64 and 65. As seen in FIGURE 2, rolls 65 are aligned with upper drive wheels 50, while rolls 64 are aligned with lower drive wheels 47.

Rolls 65 have a portion of the periphery cut out to form a concave depression 67 (FIGURE 3) to fit about the periphery of upper drive wheels 50. A stop screw 68 passing through cross bar 69 of frame 42 is held in place by a pair of nuts 70 and contacts arm 56 of rocker 55 to hold the cut out portion 67 of drive roll 65 just out of contact with the periphery of drive wheel 50. A spring 72 normally holds rockers 55 in a position such that arm 56 is in contact with stop screw 68. As will be seen, at its lower end spring 72 hooks onto a bolt 73, which bolt passes between a pair of plates 74 held on the end of arm 56 by means of rivets 75. The upper end of spring 72 is attached to an adjusting screw 76 passing through frame 42 and held in place by a pair of jam nuts 77. A second bolt 80 passing between plates 74 holds a spring 81. The lower end of spring 81 is connected to the armature 82 of a solenoid 83. As is readily apparent in FIGURES 2 and 3, all of these parts are in triplicate, with solenoids 83a, 83b and 83c being connected to rockers 55a, 55b and 55c, respectively. Solenoids 83 are mounted on platform 84 forming a part of frame 42.

On arms 57 of rockers 55 are three snap-action switches, 85a, 85b and 85c, such switches being of the type commonly sold under the trademark "Microswitch." Each of these switches 85 has an actuating arm 86. Spacers (not shown) are employed to mount switches 85 a sufficient distance away from arms 57 so that the actuating arms 86 of the switches 85 are aligned with cams 63.

Figure 4:
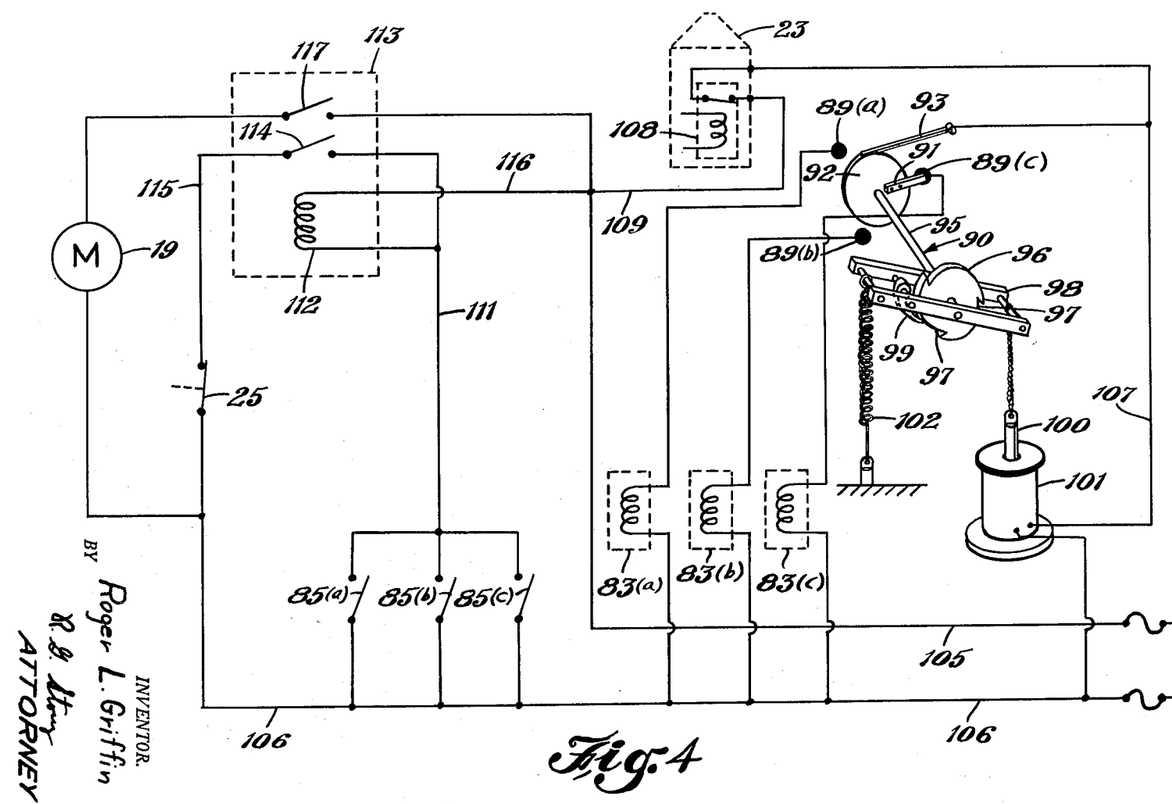
FIGURE 4 is a schematic representation of the electrical controls for the embodiment of FIGURES 1 and 2.

Referring to FIGURE 4, it will be seen that solenoids 83a, 83b and 83c are connected to contacts 89a, 89b and 89c, respectively, of a sequence switch generally 90. An arm 91 is attached to a wheel 92 with an electrical circuit existing through arm 91 through wheel 92 to a wiper 93. A shaft 95 connects wheel 92 with a ratchet wheel 96 having a plurality of ratchet pockets 97 thereon. A support 98 is pivotally mounted on shaft 95 and carries the ratchet pawl 99. One end of support 98 is connected to armature 100 of solenoid 101, while the other end of the support is connected to a spring 102. It will be apparent in FIGURE 4 that the solenoid 101, when energized, rotates support 98 in a clockwise direction so as to engage pawl 99 in one of pockets 97. When the solenoid 101 is de-energized, spring 102 rotates support 98 in the opposite direction, whereupon the ratchet rotates wheel 92 to move arm 91 from one of contacts 89 to the succeeding contact 89.

Wires 105 and 106 are connected to a suitable source of electric power. One side of each of solenoids 83 is connected to wire 106 as is one side of solenoid 101. The opposite side of solenoid 101 is connected by means of a wire 107 to the normally closed contacts of a relay 108 forming a part of the electric eye means 23. These contacts are normally closed when no light is being received by the electric eye and are opened by the flashing of a beam of light onto the electric eye of the electric eye means 23. The structure of the electric eye means 23 is conventional and forms no part of the present invention. The opposite side of the normally closed contacts of relay 108 is connected by a wire 109 to the main feed wire 105. Wiper 93 is also connected to wire 107 and thus to the normally closed contacts of relay 108.

One side of each of the snap-action switches 85a, 85b and 85c, which are normally open switches, is connected to wire 106. These switches are all in parallel with the opposite side being connected by a wire 111 to one end of the coil 112 of a relay 113 and to one of the normally open contacts 114 of the relay. A wire 115 connects the other side of the normally open contact 114 to normally closed switch 25 and thence to the feed wire 106. The other side of relay coil 112 is connected by means of a wire 116 to power feed line 105. A second pair of normally open contacts 117 of relay 113 is connected to motor 19 and to power line 105. The other side of motor 19 is connected to power line 106.

As mentioned previously herein, the present invention was devised to solve the problem of hanging sides of leather 11 over carrying members 13 of a stacker 10. It was desired that one-third of the sides of leather be hung over the forward edge of the carrying member 13, with two-thirds of the side hanging over the trailing edge. The terms forward and trailing edge are used with respect to the line of movement of conveyor 12 as represented by arrow 120, although it bears the same relationship with respect to the line of movement of the carrying members 13 of stacker 10 as represented by arrow 121. It was determined that these sides of leather 11 would vary in size between two and six feet. Under these conditions the electric light 22 and the electric eye means 23 were positioned so that the beam 21 cut conveyor 12 at a point four feet rearwardly of the pick-up point of the side of leather 11. The pick-up point is the point immediately adjacent the end of conveyor 12 at which carrying member 13 receives the side of leather as the carrying member moves upwardly in the direction indicated by arrow 121.

The movement of cam 63 from the rest point, i.e. the position at which the pocket 67 in drive roll 65 is about upper drive wheels 50, to the position at which the switch 85 is actuated to start the movement of stacker 10 is 320° in the illustrated embodiment. Drive wheels 47 are connected to conveyor 12 at a speed ratio such that cam 63 will be turned 320° in the period of time required for a six foot hide 11 to pass (from the leading edge to the trailing edge) through light beam 21. Since it was desired to have two-thirds of the hide hanging rearwardly over the carrying members 13, drive wheel 50 is connected to turn cam 63 fifty percent faster than will drive wheel 47.

Assume that sequence switch 90 is positioned with contact arm 91 resting on contact 89a so that solenoid 83a is connected to relay 108 of the electric eye means 23. The light beam 21 being received by electric eye means 23 maintains relay 108 energized so that the contacts thereof are open. When light beam 21 is cut by a side of leather 11, relay 108 relaxes to energize solenoid 83a.

The armature 82a of solenoid 83a is pulled down to pivot rocker 55a downwardly and bring drive roll 64a into contact with drive wheel 47a. This starts cam 63a rotating in a counterclockwise direction (FIGURE 3) from the rest point which was determined by the dished-out portion 67 of drive roll 65a. As long as light beam 21 remains cut, drive wheel 47a continues to control the rotation of cam 63a. If we assume that the hide that is moving along the conveyor at this time is six feet long, cam 63a will have turned 320° to actuate switch 85a at the instant the trailing edge of the hide passes the light beam 21 to allow the light beam to reactuate the electric eye means 23. Cam 63a at that instant closes switch 85a to energize coil 112 of relay 113, closing the contacts thereof. The lower contact is a holding contact to keep coil 112 energized. The upper contact 117 energizes motor 19 to start stacker 10. The carrying member 13 moves upwardly to pick up the hide with four feet of the hide (two-thirds of its length) being over the trailing edge of the carrying member and two feet of the hide being over the leading side of the carrying member.

At the same time that the hide just mentioned cut light beam 21 to energize solenoid 83a, the solenoid 101 of the sequence switch 90 was also energized to rotate pawl 99 into one of steps 97. This has no effect on the position of the sequence switch. However, when solenoid 101 was de-energized by the reestablishing of the light beam, spring 102 will rotate pawl 99 in a counterclockwise direction to rotate the contact arm 91 in the same direction and move contact arm 91 from contact 89a to contact 89b.

As carrying member 13 bearing the six foot hide moves upwardly it contacts the actuating arm 112 of switch 25 to open normally closed switch 25. This breaks the holding circuit through relay 113 to open the contacts thereof and de-energize motor 19. Assume that the hide 11 following the six foot hide is a hide three feet in length. When the leading edge of the three-foot hide cuts light beam 21, relay 108 is again de-energized to close its contacts and create a new circuit through solenoid 83b and through solenoid 101 of the sequence switch. Solenoid 83b pulls rocker 55b down, bringing drive roll 64b and wheel 47b into contact. At the instant the leading edge of the three-foot hide is one foot from the pick-up point, the trailing edge of the hide passes the light beam 21, allowing the light beam to re-establish itself. This de-energizes solenoid 83b and solenoid 101 (moving the sequence switch to contact 89c. With solenoid 83b being de-energized, spring 72b moves rocker 55b in a clockwise direction to bring drive roll 65b into contact with drive wheel 50b. Drive wheel 50b turns cam 63b fifty percent faster than the cam was when being turned by drive wheel 47b. At the time that cam 63b actuates switch 85b to operate relay 113 and energize motor 19, one-third of the three-foot hide, or one foot, will be over the leading edge of the carrying member 13 at the pick-up point, and two-thirds, or two feet, will be over the trailing edge. After actuating switch 85, cams 63 continue to rotate the full 360° at which time recess 67 in drive roll 65 fits about drive wheel 50 to stop the further movement of the cam. This is the reset, or starting position, for each rotation of the cam. In this position drive wheel 50 is maintained just out of contact with drive roll 65 by the adjustment of stop screw 68.

Another hide following after the three-foot hide will then actuate solenoid 83c. Each solenoid is thus energized in turn as determined by the position of the sequence switch 90. Whichever of the solenoids is energized, the respective cam is commenced rotating and at the end of its 320° of rotation closes its respective switch before returning to its reset position as determined by cut-out 67. The closing of the respective switch actuates relays 113 and energizes motor 19. The motor 19 is stopped by the opening of normally closed switch 25.

prior to the closing of the subsequent switch 85a, 85b, or 85c by the next hide moving along conveyor 12.

Since the hides being handled vary from six to two feet in length, it would be possible to have one hide draped over a carrying member 13 with the stacker 10 just being energized to commence picking up that hide followed by one and a part of a third hide between the trailing edge of the hide just being picked up and the line of the light beam 21. Since approximately three hides could be within this area at one time, I have three duplicate sections in the computer, each controlled by its own individual solenoid, with the stepping switch 90 operating to energize the solenoids 83 sequentially. If this condition did not exist, say for example that the articles moving along conveyor 12 were spaced sufficiently far apart so that only one could be within the critical area at any one time, two of the duplicate banks of computers and the sequence switch could be eliminated. In this case the solenoid 83 of the remaining computer would be connected directly to the contacts of relay 108 rather than being connected through the sequence switch as illustrated and described. The elimination of the two extra duplicate computer banks would also eliminate two of the three switches 85 so that relay 113 would only be controlled by the one remaining switch 85 in the remaining computer bank.

In order to illustrate how the invention may be employed with other articles or to solve other problems of a similar nature, it is first desirable that the principle of the operation of the disclosed device be clear. Cam 63 is a moving element that travels from a first, or rest, position, which position is determined by the cut-out 67 in drive roll 65 to a second position, which position is determined by the actuation of arm 86 of switch 85, in a manner such that the switch will be actuated at the time that the desired part of the article, e.g. the hide, is over a predetermined location, e.g. the pick-up point of carrying members 13, with respect to conveyor 12 with a given percentage of the length of the article rearward of that location. Since the cam 63 travels in one direction between the first and second positions, the rate of motion of the cam during any portion of its travel may be expressed as a velocity. Drive wheel 47 first moves the cam at a velocity that is related to the speed of the object along the conveyor. The second drive wheel 50, when brought into play, drives the cam at another velocity. These two velocities are so related that after the leading edge of the object passes a given point along the conveyor, e.g. the line of beam 21, the cam 63 will be moved between its first and second position at a rate such that the desired part of the object will be over the given location at the time the switch 85 is actuated with a given percentage of the object rearwardly of that location.

Figure 5:
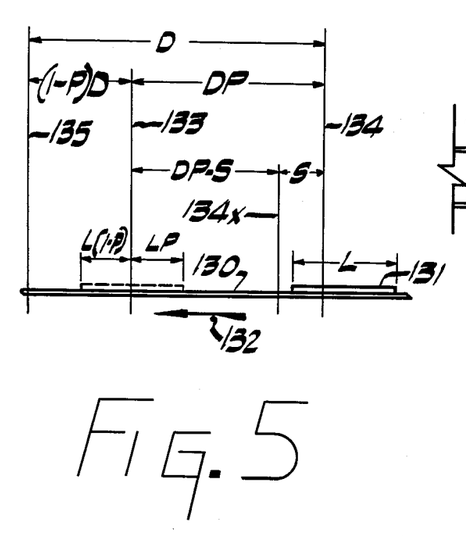
FIGURE 5 is a diagram used in decribing the principle of operation of the invention and its application for other uses.

To determine just how the two velocities may be obtained in any given application, reference might be made to FIGURE 5 wherein horizontal line 130 represents a conveyor moving objects 131 having a length L in a direction indicated by arrow 132. Vertical line 133 represents a location along conveyor 130. It is at this location that one seeks to know when a particular portion of the object 131 is over the location with a given percentage, P, of the length of the object rearwardly of the location. A point along conveyor 130 rearwardly of location 133 is chosen and is represented in FIGURE 5 by vertical line 134. The point 134 may be chosen with respect to the length of the articles 131 as was done in FIGURE 1, or it may be chosen with respect to the position of some other equipment, or for any other reason. The dimension D represents the lenth of the longest article that may be handled (and is the distance from the given point to line 135) and is dependent upon the distance between the given point and the predetermined location (line 133), that distance being equal to the given percentage of the length of the longest article otherwise expressed as DP. In some instances herein the dimension DP is represented as $d$.

The velocity, V, of cam 63 when driven by the drive wheel 47 should be such that the cam will move from its starting point to the point of actuation of switch 85 (320° in the disclosed embodiment) in the time, T, that it would take an object of the length of D to move past point 134. The formula for this velocity, therefore, is $$V = k\frac{D}{T}$$

in terms of the movement of conveyor 130 where $k$ is a factor representing the ratio of the distance cam 63 travels between the first and second positions, to the dimension D. Another way of stating this would be that an object of the length of D would start cam 63 rotating when its leading edge passed point 134 and would actuate switch 85 when its trailing edge reached point 134. When its trailing edge was at point 134 the leading edge of that object would be at the point represented by line 135. As will be hereinafter apparent it is more convenient to discuss the movement of the cam in relation to the movement of objects along the conveyor since 320° of rotation of the cam (or such other amount of angular rotation as is chosen for the distance between the starting point and the point of actuation of the switch) may be directly correlated to this dimension very readily. Thus D not only represents the length of the largest object handled but may also represent the degrees of rotation of the cam during the effective portion of its operating cycle.

The velocity of the cam 63 when driven by the upper drive wheels 50 can be derived as follows with respect to FIGURE 5:

As mentioned in the preceding paragraph, the total cam travel, starting at the time when the object 131 breaks light beam 134 by the leading edge of the object passing through the light beam until the switch 85 is actuated=D.

Similarly, the cam travel from the time that the light beam is broken at line 134 by object L moving thereacross to the time that the light beam is re-established by the rear edge of the object moving past point 134=L.

Therefore, the amount of cam travel from the time that the light is re-established to the time of actuation of switch 85. (It is, of course, desired to actuate switch 85 at the time that object L is positioned across line 133, the pick-up point, with LP of the length of the object 131 rearwardly of line 133=D−L.

The total travel of the leading edge of the object from the time that the light beam is broken by the object 131 until the object is properly positioned at the pick-up point 133=DP+L(1−P).

The total travel of the leading edge of the object from the time of light break until the light is re-established at point 134=L.

Therefore, the total travel of the leading edge of the object from the time of light re-establishment to proper positioning at pick-up point 133=DP+L(1−P)−L.

The time for the object to travel from the time the light is re-established to the time of proper positioning at the pick-up point 133 equals the time for the cam to travel from the time the light is re-established to actuation of switch 85=$t$.

Using the formula $$\text{Velocity} = \frac{\text{Distance}}{\text{Time}}$$

$$\frac{\text{Velocity of the cam (from light reestablish to pick-up point)}}{\text{Velocity of the object 131 (light reestablished to pick-up)}}$$

$$= \frac{\frac{D-L}{t}}{\frac{DP+L(1-P)-L}{t}} = \frac{D-L}{DP+L-PL-L}$$

$$= \frac{D-L}{P(D-L)} = \frac{1}{P}$$

It was pointed out in the preceding paragraph that the velocity of the cam when driven by lower wheel 47 is related to the velocity of the object on the conveyor. Therefore, the formula for determining the velocity, V′, of the cam from the time when the light is re-established, i.e. when the trailing edge of object 131 passes point 134, to the time when the object is properly positioned at the given location represented by line 133, e.g. the pick-up point, is determined from the following formula:

$$V' = \frac{1}{P}V$$

wherein V equals the velocity of the cam from the time the light is broken to the time that the light is re-established, and P equals the percentage of the object which is to be rearwardly of point 133 when the object is properly positioned at that point. The upper drive wheel 50 will turn the cam $$\frac{1}{P}$$

times the speed at which the cam is turned by lower drive wheel 47.

From the foregoing description, it will be apparent that the device I have devised carries out the method of my invention as hereinbefore described. A time standard is established, which standard is the length of time that it would take an object of D length to be properly positioned over the pick-up point 133 after the leading edge of the object traversed the given point, line 134, and corresponds to the cam travel when driven at a speed related to the speed of movement of the object on the conveyor. From that standard I subtract the length of time required by object 131 to traverse point 134 to obtain a time difference for that object. By multiplying that time difference times the percentage of the article which I wish to have rearwardly of point 133 at the time that the article is properly positioned with respect to point 133, I obtain the length of time it will take for the object to be so properly positioned after it leaves point 134.

This may be demonstrated as follows:

The distance along the conveyor that the object 131 must travel after leaving point 134

$$= DP + L(1-P) - L$$
$$= DP + L - LP - L$$
$$= P(D-L)$$

Obviously T (the time for an object of D length to move its leading edge from line 134 to line 135 when moving at the fixed velocity of the conveyor) varies with the dimension D, and in the same manner $t_1$ (the time for object 131 to move its leading edge from point 134 to a point such that its trailing edge is at point 134 moving, of course, at the same velocity) varies with the dimension L. Thence $t$, the time that it takes object 131 to move its trailing edge from line 134 to the desired position over location 133, is obtained by substitution of these into the foregoing formula, so that $t = P(T - t_1)$. The length of travel of the cam 63 from the starting point as determined by cut-out 67 to the actuation of switch 85 represents the standard, T. From this is substracted the time, $t_1$, required for the object to move across the light beam 134, by a portion of the cam travel being used up during this movement of the object 131. The remaining portion of the travel of the cam is done in a time which is P times the difference so that the machine thereby performs the computation of the method.

Figure 6:
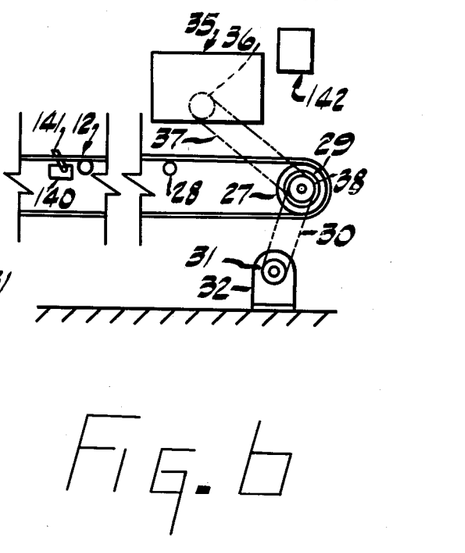
FIGURE 6 is a partial elevation of a further embodiment of the invention.
Figure 7:
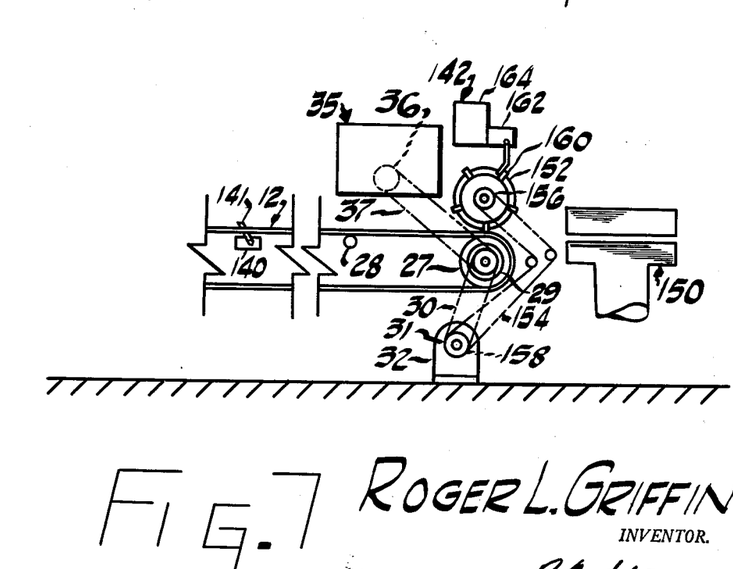
FIGURE 7 is a partial elevation showing still another embodiment of the invention.
Figure 8:
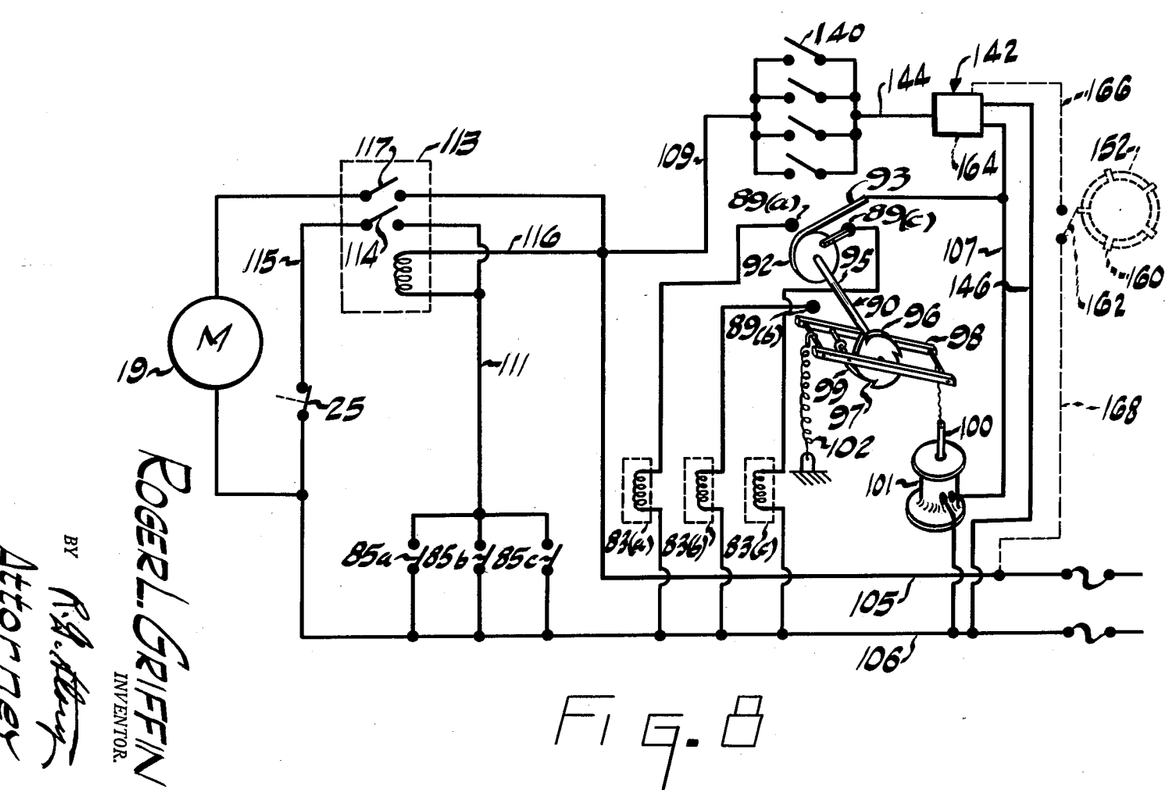
FIGURE 8 is a schematic wiring diagram for the embodiments of FIGURES 6 and 7.

Further embodiments of the invention appear in FIGURES 6 through 8. Where the leather is of a type which often exhibits irregularities, such as holes or excessively narrow portions, the electric eye means 23 used with the above described embodiment may transmit a false signal to the computer. This occurs where holes or narrow portions of the hide permit reestablishment of the light beam 21 between the source 22 and the electric eye means 23. To avoid this undesirable characteristic, it has been found advantageous to substitute a plurality of sensing switches 140 having trigger arms 141 extending into the path of the conveyor 12 between ribbons 26. As may be observed in FIGURE 6, and the wiring diagram of FIGURE 8, a delay mechanism generally 142 is used in conjunction with the switches 140 and is interposed, electrically, between the switches and the sequence switch generally 90.

It has been found that in the usual hide having the type of irregularities with which we are concerned, such irregularities almost always occur within eighteen inches of the trailing edge of the leather. The first described embodiment functions improperly where the light beam 21 is allowed to be re-established momentarily, by way of the irregularity, and then broken as the remainder of the hide passes between the light source and electric eye means. From the foregoing description, it is clear that where the light beam is re-established, the electric circuit to the sequence switch 90 is broken and the operating section of the computer is shifted to the second speed. When the light beam is again broken, the sequence switch is reconnected and indexes to the next position energizing another section of the computer as if a leading edge of a new side of leather was proceeding toward the stacker. Therefore, if re-establishment of the electric circuit to the sequence switch 90 is prevented for a period of time equal to that necessary for the leather to travel approximately eighteen inches along the conveyor 12, the false signals will not affect the computer. This is the function of the time delay mechanism generally 142. Further, since any one of the sensing switches 140 will establish and hold the electrical circuit between the power source and the sequence switch (through the delay mechanism 142), the chance that an irregularity in a hide will break and re-establish the circuit is substantially reduced.

It has been found that the delay mechanism may take either of two basic forms. The first is essentially a time delay to be used in conjunction with a continuously moving conveyor 12. The second is a delay mechanism based upon increments of movement of the conveyor 12, or associated apparatus, and is used in conjunction with an intermittently operated conveyor.

The time delay apparatus and fundamental circuitry is illustrated in FIGURE 6 and the portion of the wiring diagram of FIGURE 8 consisting of solid lines. As may be seen in FIGURE 6, a plurality of sensing switches 140 are disposed transversely across the path of conveyor 12 with trigger arms 141 of the switches extending upwardly in the path of the sides of the leather 11 between the ribbons 26 of the conveyor. The delay mechanism 142 is in the form of a commercially available electronic time delay relay manufactured and sold by the General Electric Company, Catalogue No. CR7504–A142–G2. This unit can be adjusted to give the desired time interval between the instant that a potential is placed on one side of the unit and the instant that the circuit is completed. As may be seen in FIGURE 8, the basic wiring diagram is substantially the same as previously described. The electric eye means 23 is omitted and in its place one side of the bank of sensing switches 140 is connected to wire 109. The other side of the sensing switches 140 is connected by means of wire 144 to the delay mechanism 142. A wire 146 is connected directly between the delay mechanism 142 and wire 106 (which is connected to one terminal of the source of electric power). The delay mechanism 142 is also connected to the wiper 93 of sequence switch 90 by means of the wire 107.

The operation of the device employing the time delay relay, briefly is as follows: A side of leather 11 traveling on the conveyor 12 will depress one or more of the trigger arms 141 of switches 140 thereby connecting the time delay relay 142 with the source of electric power through wires 109 (to wire 105) and wire 146 (to wire 106). At the end of the selected time interval after the trigger arms 141 are depressed, the time delay relay will operate to connect wire 144 with wire 107 and thereby complete the electrical circuit through the sequence switch 90 to the computer 35. Upon the circuit through sensing switches 140 being broken (which would require all of the switches to be released to the open position), the time delay relay 142 will automatically reset and the circuit to the sequence switch will not be re-established thereby until at least one of the switches 140 is again closed and the desired interval elapsed. Therefore, if one or more of the sensing switches 140 should be closed and then opened before the desired interval elapses, a circuit to the sequence switch and the computer will not be completed. The operation of the computer 35 and the stacker 10 is much the same as hereinbefore described. However, to accommodate the time delay, the computer is constructed to operate at somewhat different speeds. This will be better described in connection with the following description of another embodiment of an apparatus employing a delay mechanism.

Should it be desired to apply the computer device to an intermittently moving conveyor 12, additional modifications must be employed. Obviously, if the computer device should be driven independently of the conveyor, or if an electronic time delay means such as that described above is used, in conjunction with such intermittent operations, the projected time at which a hide will be over the carrying member 13 may be in error. This is due to the fact that the previously described embodiments are for a continuously moving conveyor and all computations are dependent on time periods based upon uninterrupted travel of a hide 11.

FIGURE 7 illustrates an embodiment wherein the conveyor 12 receives hides 11 from a processing machine such as a leather press generally 150. The press 150 consists of a pair of upper and lower platens, at least one of which is reciprocable with respect to the other. Normally, three or four cuts of the press 150 are required on each side of leather 11. Thus, the progress of the leather onto the conveyor 12 will be by intermittent steps of a length no greater than the dimension of the press platen. The conveyor 12, preferably is regulated by a suitable control means, not shown, to operate only when the press 150 is in a condition to discharge the leather 11. The interval of operation and the speed of the conveyor will be dependent upon the cycle of the processing machine and the length of leather discharged at each step.

To handle the leather in a positive manner, a feed roll generally 152 is positioned above the conveyor 12 at drum 27. The feed roll 152 is rotatably supported in any convenient manner such as on an axle journaled in the machine frame (not shown), and connected by means of a drive chain 154 and a sprocket 156 thereon to a sprocket 158 connected to the gear head motor 32 next to the sprocket 31. Thus, the feed roll 152 may be driven at the same linear speed as conveyor 12, and will cooperate to move the sides of leather toward the stacker.

At one side of the feed roll 152 is a plurality of cam projections 160 which are uniformly spaced about the periphery of the roll. In the actual machine, these projections are spaced at intervals of about two inches. An impulse switch 162 is positioned near the feed roll with the trip lever thereof disposed in the path of the projections 160. The switch 162 may be conveniently attached to a side of delay mechanism generally 142, which, in this embodiment, takes the form of an impulse counter 164. The impulse counter 164 is a standard, commercially available device manufactured by the Eagle Signal Corporation, Catalogue No. HZ4086, and commonly sold under the trade name "Microflex." It is an adjustable unit with an automatic reset mechanism for returning the counter to the zero position after the desired number of impulses have been received.

The electric circuit for this apparatus is basically the same as shown for the delay mechanism 142 having certain additional parts which are shown by broken lines in the wiring diagram of FIGURE 8. In a manner similar to that described previously, the impulse counter 164 is connected by wire 144 to the switches 142. The impulse counter 164 is also connected to the sequence switch 90 by means of wire 107, and to wire 106 (and thereby to one terminal of the source of electric power) by means of wire 146. In addition, the counter 164 is connected to one side of the impulse switch 162 by means of a wire 166. The opposite side of switch 162 is connected by means of a wire 168 to wire 105 (and thus to the second terminal of the source of electric power). Thus, one complete electric circuit may be established to the impulse counter 165 whenever the impulse switch 162 is closed regardless of the attitude of switches 140.

The operation of the equipment employing the impulse counter 164 is as follows. Sides of leather 11 are withdrawn from the operating machine 150 in steps of a given length and thus carried intermittently along conveyor 12 past the sensing switches 140. Whenever the conveyor 12 is moving, an electrical impulse will be transmitted from impulse switch 162 to the counter 164 for every two inch increment of conveyor travel. Thus, the impulse counter 164 may be set so that after a switch 140 has been closed and the conveyor 12 moved thereafter a predetermined distance, the counter will connect the circuit through wires 144 and 107 to the sequence switch 90 and thus to the computer. Should all of the switches 140 reopen before the counter 164 makes the connection between wires 144 and 107, the counter will automatically reset to zero and the cycle must be repeated before a connection can be completed. Obviously, should the conveyor 12 stop at any time while the side of leather 11 continues to maintain one or more of the switches 140 closed, the cycle will not be interrupted and the computer will be energized after the selected portion of the length of hide 11 has passed. Since the computer 35 is driven from the conveyor drum 27 by chain 37, interruption of the conveyor travel will also interrupt the operation of the computer once it is energized, but the computer will continue its cycle upon recommencement of conveyor motion. Therefore, the stacker apparatus will be initiated to properly receive each side of leather regardless of interruptions of the conveyor 12.

The construction of the computer remains essentially the same as in the aforementioned embodiments. However, since a delay is interposed between the time that the leather 11 actuates switch 140 and the time that the computer 35 is energized, the speeds of drive wheels 47 and 50 must be adjusted accordingly. The manner in which the two velocities may be determined is as follows. The dimension S, as it appears in FIGURE 5, is the length of conveyor travel representing the time delay. Line 134 represents the position of switches 140 and line $134_x$ represents the point the leading edge of an article on conveyor 12 will have reached when the operation of the computer is initiated. Thus, it may be seen that the velocity, $V_x$, of cam 63 when driven by the drive wheel 47 should be such that the cam will move from its starting point to the point of actuation of switch 85 (320° in the disclosed embodiment) in the time, $T_x$, that it would take an object of length $D-S$ to move past point $134_x$. The formula for this velocity, therefore, is:

$$V_x = k\frac{D-S}{T_x}$$

(where $k$ is a factor representing the ratio of the distance cam 63 travels between the starting point and the point of actuation, to the dimension ($D-S$) in terms of the conveyor 130. Another way of stating this would be that an object of the length D would start cam 63 rotating when its leading edge had traveled a distance equal to S beyond point 134 and would actuate switch 85 when its trailing edge reached point 134. At the latter time, the leading edge of that object would be at the point represented by line 135 and the object would be properly positioned over a carrying member 13 (at line 133).

The velocity of the cam 63 when driven by the upper drive rolls 50 can be derived in the same manner as for the earlier described embodiments. Referring to FIGURE 5:

As noted, the total cam travel, starting at the time when an object 131 has traveled a distance S after the leading edge of the object has closed a switch 140 until the switch 85 is actuated $=D-S$.

Similarly, the cam travel from the time the leading edge of an object 131, of length L, has traveled the distance S after closing switch 140 to the time that the switch reopens when the rear edge of the object moves past point $134 = L - S$.

Therefore, the amount of cam travel from the time that the switch reopens to the time of actuation of switch 85 (when an object 131, of L length, is properly positioned across line 133) $= (D-S) - (L-S) = D-L$.

The total travel of the leading edge of object 131 from the time that it has reached a distance S beyond switches 140 (line 134) until the object is properly positioned at the pick-up point $133 = DP - S + L(1-P)$.

The total travel of the leading edge of the object from the time that it has reached a distance S beyond the switches 140 until the time the switches are reopened $= L - S$.

Therefore, the total travel of the leading edge of the object from the time the switches 140 reopen to proper positioning at pick-up point 133

$$= DP - S + L(1-P) - (L-S)$$
$$= DP + L(1-P) - L$$

The time for the object to travel from the time the switches are reopened to the time for proper positioning at the pick-up point 133 equals the time for the cam to travel from the time the switches are reopened to actuation of the switch $85 = t_x$.

Using the formula $$\text{Velocity} = \frac{\text{Distance}}{\text{Time}}$$

$$\frac{\text{Velocity of the cam (from switch reopen to pick-up point)}}{\text{Velocity of the object 131 (switch reopen to pick-up)}}$$

$$= \frac{\frac{D-L}{t_x}}{\frac{DP+L(1-P)-L}{t_x}} = \frac{D-L}{DP+L-PL-L} = \frac{1}{P}$$

As before, the formula for determining the velocity $V'_x$ of the cam from the time the switches 140 are reopened, i.e. when the trailing edge of object 131 passes point 134, to the time when the object is properly positioned at a given location represented by line 133, e.g. the pick-up point, is therefore determined from the following formula:

$$V'_x = \frac{1}{P}V_x$$

Thus we may arrive at the speed of the upper drive wheel 50 which drives the cam during the latter interval.

Summarizing, we have shown that the speeds at which cam 63 should be driven by drive wheel 47 and drive wheel 50 are $$V_x = k\frac{D-S}{T_x} \text{ and } V'_x = \frac{1}{P}V_x$$

respectively. It has been stated that the dimension DP (the distance between the switches 140 and the end of conveyor 130, in Figure 5) is represented by $d$. Therefore, the speeds may be readily presented in terms of the dimensions of the conveyor as follows:

$$\text{since } DP = d, \text{ then } D = \frac{d}{P}$$

$$V_x = k\frac{D-S}{T_x} = k\frac{\frac{d}{P}-S}{T_x} = k\frac{d-SP}{PT}$$

It will have become apparent that the method of my invention will be carried out by the latter embodiments. A time standard, or control time rundown is established, which standard is the length of operating time that it would take the conveyor to properly position an object of D length over the pick-up point 133 after the leading edge of the object traverses the given point, line $134_x$, a distance S beyond switches 140 (line 134), and corresponds to the cam travel when driven at a speed dependent on the motion of the object on the conveyor. From the standard I subtract the length of operating time required to carry object 131 a distance equal to its length L less the dimension S to obtain a time difference for that object. By multiplying that time difference times the percentage of the article which I wish to have rearwardly of point 133 at the time that the article is properly positioned with respect to point 133, I obtain the length of time it will take for the object to be so properly positioned after its trailing edge leaves point 134. It is understood that by operating time only the actual period that the object is in motion is meant to be considered. Thus, if the motion is interrupted, as in the last embodiment, the method will still apply.

With reference to the explanation given with the previously described embodiments, the time $t_x$ necessary for the object to reach its proper position after the trailing edge leaves point 134 may be demonstrated as follows. As in the prior embodiments, the distance along the conveyor that the object 131 must travel after leaving point 134 equals $P(D-L)$. Obviously $t_x$ varies with this distance. Therefore, we may substitute the following time dimensions for D and L in the foregoing formula:

$T_x$ (the operating time for an object of D length to move its leading edge from line $134_x$ to line 135) may be substituted for D since $T_x$ varies with the dimension $D-S$ and S is constant; and $t_{x1}$ (the operating time for an object 131 to move its leading edge from point $134_x$ to a point such that its trailing edge is at point 134) which varies with the dimension ($L-S$) may be substituted for L since, again, S is constant. Thus $t_x = P(T_x - t_{x1})$. The length of travel of the cam 63 from the starting point as determined by cutout 67 to the actuation of switch 85 represents the standard, $T_x$. From this is subtracted the time, $t_{x1}$, required by a portion of the cam travel being used up during the movement of the object 131 across switches 140. The remaining portion of the travel of the cam is done in a time which is P times the difference so that the machine thereby performs the computation of the method.

The foregoing detailed description is only for clearness of understanding and for the purpose of complying with 35 U.S.C. 112, and I do not desire to be limited to the exact details of construction shown and described for obvious modifications will occur to a person skilled in the art.

I claim:

1. A control device for determining when a portion of the length of each of a series of articles of varying sizes traveling along a conveyor will have arrived at a predetermined location along said conveyor with a predetermined percentage of the length of an article being rearwardly of said location, said device comprising a cam mounted for rotation along a given path from a first position, actuating means positioned at a second position along said path, a first driving means for said cam, a second driving means for said cam, means to engage said cam with said first driving means when the leading edge of an article on said conveyor has proceeded a preselected distance beyond a given point along said conveyor and to disengage said cam from said first driving means and to engage said cam with said second driving means when the trailing edge of said article passes said given point, said first driving means being effective when engaged with said cam to rotate said cam toward said second position at a first velocity related to the speed of movement of said sheet on said conveyor, said second driving means being effective when engaged with said cam to rotate said cam in the same direction at another velocity, said velocity being such that a given percentage of the length of said article will be rearwardly of said location when said cam reaches said second position, and means to stop said cam upon said cam returning to said first position.

2. A control device for determining when a predetermined percentage of the length of each of a series of articles of varying sizes traveling along a conveyor will have passed a predetermined location along said conveyor, said device comprising a member movable between a first and a second point, and means connecting said movable member to said conveyor for commencing the movement of said member from said first point at the time the leading edge of an article on said conveyor has proceeded a preselected distance beyond a given point along said conveyor ahead of said location, to move said member at a velocity related to the rate of speed of movement of the article until the trailing edge of said sheet passes said given point and thereafter to move said movable member at a second velocity, said velocities being such that said percentage of said length will be beyond said location when said member reaches said second point.

3. A device for removing sheets of material from a conveyor, said device comprising a frame, endless means mounted on said frame, said means being positioned on said frame to have a generally vertical run positioned at the discharge end of said conveyor, a carrying member supported on said endless means for movement thereby along said run, power means connected to said endless means to move said member upwardly along said run, and control means operatively connected to said power means to stop the movement of said endless means when said member is immediately adjacent the end of said conveyor in a position that a sheet from said conveyor will pass over said member, said control means including a member movable between a first and a second point, said control means being effective to start the movement of said endless means when said movable member reaches said second point, and means connecting said movable member to said conveyor for commencing the movement of said movable member from said point at the time the leading edge of a sheet on said conveyor has proceeded a preselected distance beyond a given point along said conveyor to move said movable member at a rate of speed related to the speed of movement of the sheet until the time the trailing edge of said sheet passes said given point, and to move said movable member at a second rate of speed from said last mentioned time, said rates of speed being such that a segment of the sheet representing a predetermined percentage of the total length of said sheet will have passed over said carrying member when said control means starts the movement of the endless means.

4. A device for removing sheets of material from a conveyor when a predetermined percentage of the total length of said sheet will have passed beyond the end of said conveyor, said device comprising a sheet carrying member movable from a position adjacent the end of the conveyor to a second position spaced from said end of said conveyor, power means connected to move said carrying member, means to stop said carrying member upon reaching said second position, and control means operatively connected to said power means to initiate movement of said carrying member when said predetermined percentage of the sheet has passed beyond the end of said conveyor, said control means including a member movable between a first and a second point, said control means being effective to start the movement of said carrying member when said movable member reaches said second point, and means connecting said movable member to said conveyor for commencing the movement of said movable member from said first point at the time the leading edge of a sheet on said conveyor has proceeded a preselected distance beyond a given point along said conveyor to move said movable member at a first rate of speed related to the speed of movement of the sheet until the time the trailing edge of said sheet passes over said given point, and to move said movable member at a second rate of speed from said last mentioned time, said rates of speed being such that a segment of the sheet representing a predetermined percentage of the total length of said sheet will have passed beyond the end of said conveyor when said control means starts the movement of the carrying member.

5. The device of claim 4 wherein the first speed of said movable member is determined by the formula $$V = k \frac{d - PS}{PT}$$

wherein $d$ is the distance from the given point to the end of said conveyor, P is the ratio of the length of the portion of the sheet desired to remain on the conveyor side of said carrying member to the total length of the sheet, S is the preselected distance, T is the time for a sheet of $$\left(\frac{d}{P} - S\right)$$

length to move past a given point on said conveyor, and $k$ is a factor dependent upon the distance through which the movable member travels from said first to said second point, said second velocity (V') being determined from the formula $$V' = \frac{V}{P}$$

6. A device for removing sheets of material from a conveyor, said device comprising a frame, endless means mounted on said frame, said means being positioned on said frame to have a generally vertical run positioned at the discharge end of said conveyor, a carrying member supported on said endless means for movement thereby along said run, power means connected to said endless means to move said member upwardly along said run, and control means operatively connected to said power means to stop the movement of said endless means when said member is immediately adjacent the end of said conveyor in a position that a sheet from said conveyor will pass over said member, said control means including a member movable between a first and a second point, said control means being effective to start the movement of said endless means when said movable member reaches said second point, and means connecting said movable member to said conveyor for commencing the movement of said movable member from said first point at the time the leading edge of a sheet on said conveyor has proceeded a preselected distance beyond a given point along said conveyor, to move said movable member at a first velocity until the time the trailing edge of said sheet passes said given point, and to move said movable member at a second velocity from said last mentioned time, said first velocity (V) being determined by the formula $$V = k \frac{d - PS}{PT}$$

wherein $d$ is the distance from the given point to the end of said conveyor, P is the ratio of the length of the portion of the sheet desired to remain on the conveyor side of said carrying member to the total length of the sheet, S is the preselected distance, T is the time for a sheet of $$\left(\frac{d}{P} - S\right)$$

length to move past a given point on said conveyor, and $k$ is a factor dependent upon the distance through which the movable member travels from said first to said second points, said second velocity (V') being determined from the formula $$V' = \frac{V}{P}$$

7. In a system for determining the instant at which a desired portion of each of a series of sheets of varying length moving in a given direction along a path have passed across a fixed location on said path: a conveying means for moving the sheets in said direction along said path; sensing means for detecting and signaling the presence of an edge of a sheet at a given point on said path spaced in the reverse of said direction from said fixed point; computing means operatively connected to said sensing means for determining the instant at which a desired proportion of said sheet, measured from an edge, has reached said location; and delay means interposed between said detecting means and said computing means to delay the signal created by a leading edge of a sheet for an interval sufficient to permit the leading edge of the sheet to advance beyond said given point a selected distance before said computing means is initiated.

8. A method for determining the time interval necessary for the leading edge of an object to proceed beyond a given point until said object is disposed adjacent a fixed location at a given distance from said point with a given proportion of the object remaining between said location and said point, the method comprising: detecting the presence of the leading edge of said object at said given point; commencing a control time rundown at a first rate at the time said leading edge is detected, said first rate of said rundown being normally sufficient for an article of a length equal to said given distance to become properly positioned at said fixed location with said given proportion of said length remaining between said location and said point; detecting the presence of the trailing edge of said object at said given point; and completing said control time rundown at a faster second rate beginning at the instant said trailing edge is detected whereby the rundown will end at the instant said object is disposed adjacent said location with said proportion of its length remaining between said location and said point.

9. A method for determining the time interval necessary for the leading edge of an object to proceed beyond a given point until said object is disposed adjacent a fixed location at a given distance from said point with a given proportion of the object remaining between said location and said point, the method comprising: detecting the presence of the leading edge of said object at said given point; delaying a preselected interval whereby said leading edge proceeds a selected distance beyond said point; commencing a control time rundown at a first rate at the termination of said delay interval, said first rate of said rundown being normally sufficient for an article of a length equal to said given distance to become properly positioned at said fixed location with said given proportion of said length remaining between said location and said point; detecting the presence of the trailing edge of said object at said given point; and accelerating said control time rundown to a second rate beginning at the instant said trailing edge is detected whereby the rundown will end at the instant said object is disposed adjacent said location with said proportion of its length remaining between said location and said point.

10. The method of claim 8 wherein said second rate for completing the control time rundown after the trailing edge of the object is detected is equal to said first rate multiplied by the reciprocal of said given proportion.

11. The method of claim 9 wherein said second rate for completing the control time rundown after the trailing edge of the object is detected is equal to said first rate multiplied by the reciprocal of said given proportion.

12. A method for determining the time interval necessary for the leading edge of an object to proceed beyond a given point until said object is disposed adjacent a fixed location at a given distance from said point with a given proportion of the object remaining between said location and said point, the method comprising: detecting the presence of the leading edge of said object at said given point; commencing a control time rundown at a first rate at the time said leading edge is detected, said rate being dependent upon the relationship of $$\frac{d}{PT}$$

wherein $d$ is said given distance, P is said given proportion and T is the time necessary for an article of $$\frac{d}{P}$$

length to pass said given point on said conveyor; detecting the presence of the trailing edge of said object at said given point; and completing said control time rundown at a faster second rate beginning at the instant said trailing edge is detected, said second rate being equal to said first rate multiplied by the reciprocal of P whereby the rundown will end at the instant said object is disposed adjacent said location with said proportion of its length remaining between said location and said point.

13. A method for determining the time interval necessary for the leading edge of an object to proceed beyond a given point until said object is disposed adjacent a fixed location at a given distance from said point with a given proportion of the object remaining between said location and said point, the method comprising: detecting the presence of the leading edge of said object at said given point; delaying a preselected interval whereby said leading edge proceeds a selected distance beyond said point; commencing a control time rundown at a first rate at the termination of said delay interval said first rate being dependent upon the relationship of $$\frac{d - PS}{PT}$$

wherein $d$ is said given distance, P is said given proportion, T is the time necessary for an article of $$\left(\frac{d}{P} - S\right)$$

length to move past said given point, and S is said selected distance; detecting the presence of the trailing edge of said object at said given point; and completing said control time rundown at a faster second rate beginning at the instant said trailing edge is detected, said second rate being equal to said first rate multiplied by the reciprocal of P whereby the rundown will end at the instant said object is disposed adjacent said location with said proportion of its length remaining between said location and said point.

14. In a method for removing a sheet of material from a path, the steps comprising: moving the sheet along the path at an established rate of speed past a point toward a fixed location spaced a given distance therefrom; detecting the presence of the leading edge of said object at said point; delaying a preselected interval whereby said leading edge proceeds a selected distance beyond said point; commencing a control time run-down at a first rate upon the termination of said delay intervals, said first rate of said run-down being normally sufficient for an article of a length equal to said given distance to become properly positioned at said fixed location with said given proportion of said length remaining between said location and said point; detecting the presence of the trailing edge of said object at said point; accelerating said control time run-down to a second rate beginning at the instant said trailing edge is detected whereby the run-down will end at the instant said object is disposed adjacent said location with said proportion of its length remaining between said location and said point; and then contacting the sheet to lift it from the path upon the termination of said control time run-down, the area of contact being at said location.

References Cited in the file of this patent
UNITED STATES PATENTS 2,837,198    Griffin  ---------------- June 3, 1958

UNITED STATES PATENT OFFICE
CERTIFICATE OF CORRECTION

June 6, 1961

Patent No. 2,987,162

Roger L. Griffin

It is hereby certified that error appears in the above numbered patent requiring correction and that the said Letters Patent should read as corrected below.

Column 2, line 7, for "to" read -- of --; column 6, line 48, for "89c" read -- 89c) --; column 8, line 47, for "85." read -- 85 --; line 50, for "133=D—L." read -- 133)=D—L. --; column 13, line 63, for "switchfreopen" read -- switch reopen --.

Signed and sealed this 31st day of October 1961.

(SEAL)
Attest:

ERNEST W. SWIDER
Attesting Officer

DAVID L. LADD
Commissioner of Patents
USCOMM-DC